(No Model.) 2 Sheets—Sheet 1.
C. H. RUDD.
DEVICE FOR MEASURING ELECTRICAL CURRENTS.
No. 480,039. Patented Aug. 2, 1892.
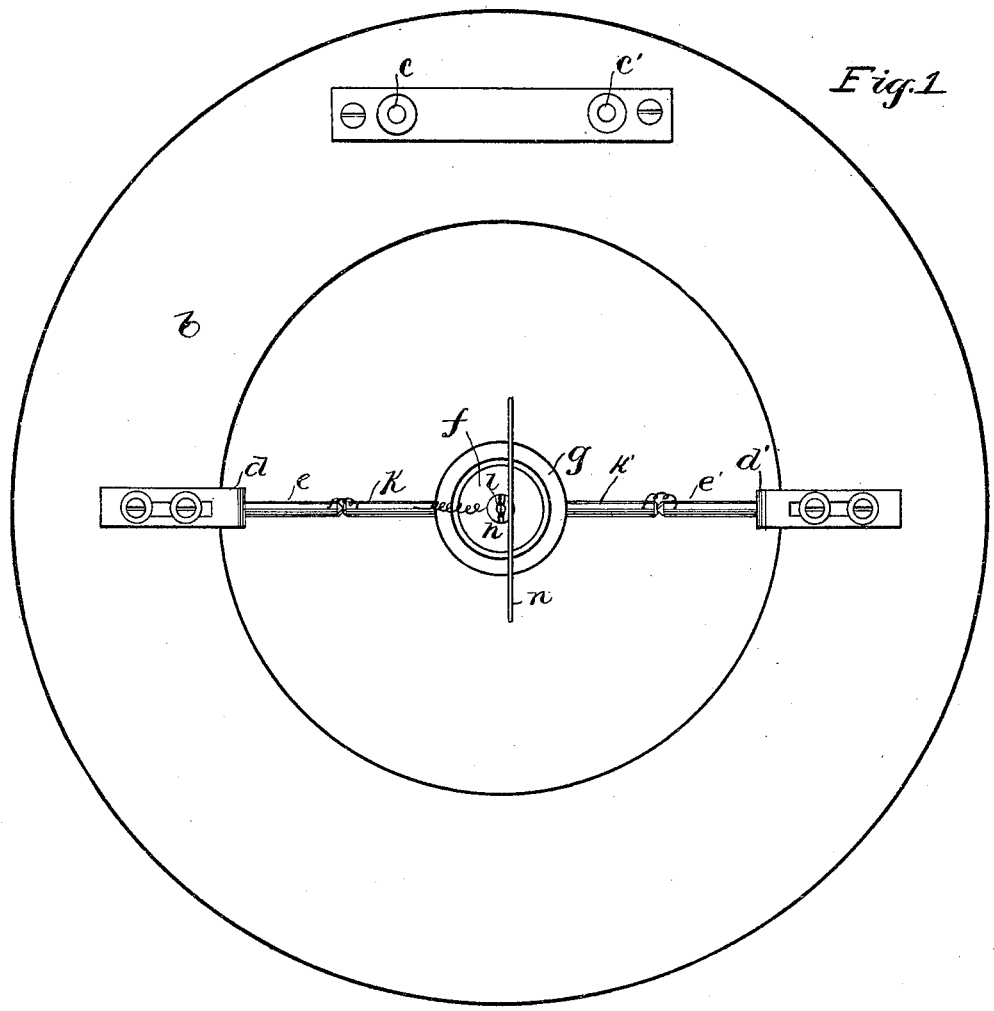
Fig.1
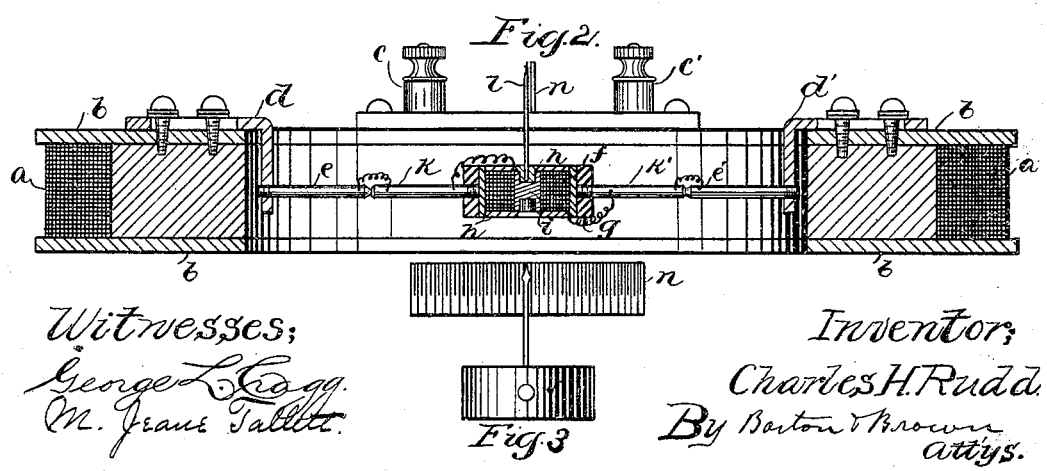
Fig.2
Fig.3
Witnesses:
George L. Cragg.
M. Jeane Tallett.
Inventor:
Charles H. Rudd.
By Borton & Brown
attys.

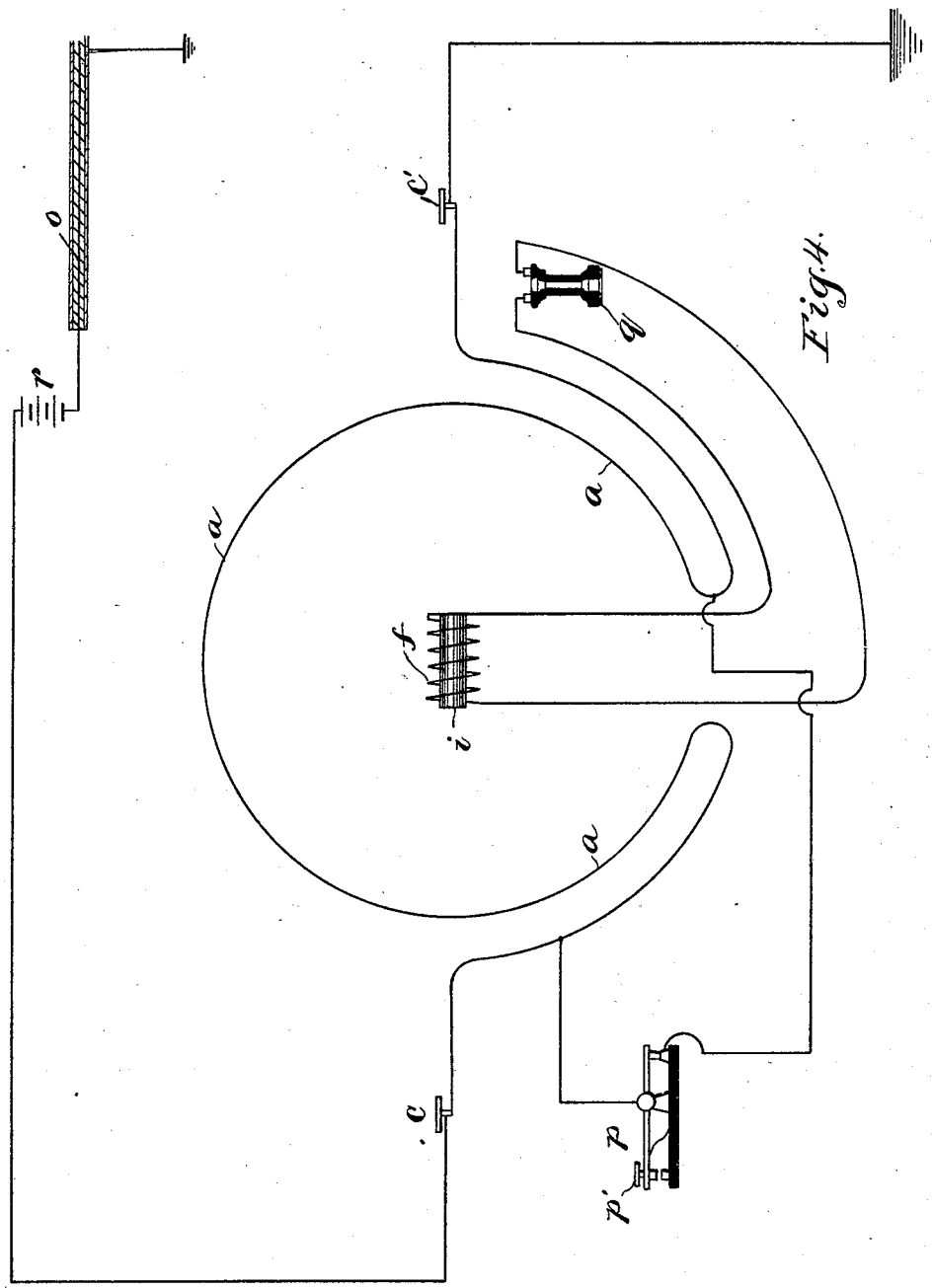

UNITED STATES PATENT OFFICE.

CHARLES H. RUDD, OF EVANSTON, ASSIGNOR TO THE WESTERN ELECTRIC COMPANY, OF CHICAGO, ILLINOIS.

DEVICE FOR MEASURING ELECTRICAL CURRENTS.

SPECIFICATION forming part of Letters Patent No. 480,039, dated August 2, 1892.

Application filed November 6, 1891. Serial No. 411,090. (No model.)

*To all whom it may concern:*

Be it known that I, CHARLES H. RUDD, a citizen of the United States, residing at Evanston, in the county of Cook and State of Illinois, have invented a certain new and useful Improvement in Devices for Measuring Electrical Currents, (Case No. 12,) of which the following is a full, clear, concise, and exact description, reference being had to the accompanying drawings, forming a part of this specification.

My invention relates to an apparatus for measuring electrical currents. It has for its object to provide a new form of apparatus for making electrical measurements, devoid of delicate or suspended parts, and requiring no adjustment other than that involved in the actual measurement.

My invention consists of a coil in the circuit of current to be measured, adapted to create a magnetic field, a suitable key to interrupt or shunt the current through the coil, another coil placed in the magnetic field and concentric with the first coil, and a telephone-receiver included in the circuit of the second coil, one of the coils movable, so that its axis may be turned to make any angle with the axis of the other coil. When the axes of the two coils are placed coincident, the starting or interruption of a current in the "field-coils," as I shall call that one conveying the current to be measured, will induce a current in the other coil, the "measuring-coil," which will be indicated in the telephone by a sound of greater or less loudness, corresponding to the strength of current in the field-coil. The movable coil is then rotated, so that the axis of the two make an angle with each other, when the induced current in the measuring-coil at each starting or interruption of the current in the field-coil will be diminished and a feebler sound will be produced in the telephone. An angle between the axes will finally be found at which the sound in the telephone just wholly disappears. The angle between the axes of the two coils when a certain known current traverses the field-coil is then measured, when the unknown current may be calculated, the two currents being to each other as the tangents of the angles at which sound in the telephone disappeared in the two cases, respectively.

My invention is especially designed for use as a portable instrument for measuring resistance of conductors and insulations.

My invention is illustrated in the accompanying drawings.

In the drawings, Figure 1 is a side elevation of my improved measuring-instrument. Fig. 2 is a vertical section through the center thereof. Fig. 3 is a detached view of the measuring-coil and the index and scale whereby the angle between the two is read in testing the insulation of a cable. Fig. 4 is a diagram showing the arrangement of the circuits.

I will indicate parts in the drawings by letters of reference, like parts being designated by similar reference-letters.

In Figs. 1 and 2, $a$ is the field-coil, wound upon a suitable spool $b$ and having its terminals connected to binding-posts $c\ c'$. Brackets $d\ d'$ are secured to the spool $b$ and carry points $e\ e'$. $f$ is the measuring-coil, also wound upon a suitable spool $g$ and inclosed in a protecting-case $h$. The coil $f$ is provided with a short soft-iron core $i$ to increase its sensitiveness. The measuring-coil $f$ and its inclosing parts are supported so as to be movable upon the spindles $k\ k'$, secured to the case $h$ and journaled upon points $e\ e'$. The coil $f$ is provided with an index $l$, moving before a scale $n$, fixed to the spool of the field-coil, whereby the angle between the axes of the two coils may be measured.

Referring now to Fig. 4, I have shown the field-coil $a$ in a circuit with a battery $r$ and the insulation of a cable $o$, which is to be measured. A key $p$ is provided with circuit connections, whereby it is adapted normally to short-circuit the field-coil $a$, but to remove the short-circuit when the handle $p'$ is depressed. $q$ is a telephone-receiver included in circuit with the measuring-coil $f$. The measuring-coil $f$ is first turned so that its axis coincides with that of coil $a$—that is, perpendicular to the plane of the paper. Then while the key is repeatedly depressed the coil $f$ is turned until the sound produced by the making and breaking of current in coil $a$ just disappears. The angle between the axes of the two coils is then read by means of the index $l$ of coil $f$ and the scale $n$ upon coil $a$. The scale $n$ may be a straight scale. Then the tangent of the angle between the two coils will be indicated by the index. The tangent of the angle thus found is compared with the tangent of that angle between the two coils corresponding to a known current in coil $a$, when the ratio of the unknown current to the known becomes apparent.

In the drawings I have shown the scale $n$ as straight. In this case the tangent may be read directly from the scale in the well-known manner.

My invention is capable of various modifications, which will occur to those skilled in the art to which it pertains, without departing from the essential features thereof. Therefore I do not limit myself to the precise form shown; but

I claim as new and desire to secure by Letters Patent—

1. The combination, with a field-coil, of a measuring-coil concentric with and in the field thereof and movable with respect thereto and a telephone in the circuit of the measuring-coil, substantially as described.

2. The combination, with a field-coil in circuit of the current to be measured, of a measuring-coil concentric with and in the field of said field-coil and movable with respect thereto, and means for interrupting the current through the field-coil, and a telephone included in the circuit, substantially as described.

3. The combination, with a field-coil in circuit of the current to be measured, of a measuring-coil rotatable about one of its diameters, said diameter being coincident with a diameter of the field-coil, placed concentric with said field-coil, and suitable means for interrupting the current through said field-coil, an index in connection with said measuring-coil, and a scale adapted to indicate the angle between the axes of the two coils, and a telephone included in the circuit, substantially as described.

4. The combination, with a field-coil in circuit of the current to be measured, of a measuring-coil rotatable about a diameter, said diameter being coincident with a diameter of the field-coil placed concentric with said field-coil, suitable means for interrupting the circuit through said field-coil, a suitable scale attached to said field-coil, and a suitable index attached to said measuring-coil, adapted to indicate on the scale the angle between the planes of the two coils, and a telephone included in the circuit, substantially as described.

In witness whereof I hereunto subscribe my name this 28th day of September, A. D. 1891.

CHARLES H. RUDD.

Witnesses:
FRANK R. McBERTY,
GEORGE L. CRAGG.